United States Patent Office 3,351,626
Patented Nov. 7, 1967

3,351,626
N-CYCLOPROPYLMETHYL BENZMORPHAN DERIVATIVES
James Richard Bartels-Keith, Welwyn Garden City, England, and Maxwell Gordon, Elkins Park, Pa., assignors to Smith Kline & French Laboratories, Philadelphia, Pa., a corporation of Pennsylvania
No Drawing. Filed Jan. 22, 1963, Ser. No. 253,032
Claims priority, application Great Britain, Jan. 31, 1962, 3,723/62
4 Claims. (Cl. 260—294.3)

This invention relates to new 5,9-dialkyl-6,7-benzmorphan derivatives having novel pharmacodynamic activity, especially as analgetic antagonists of particularly long duration of action. The antagonistic effects of these compounds are particularly pronounced against the benzmorphan analgetics such as phenazocine and its analogues. While total antagonism is apparent at higher doses of these new antagonists, specific antagonism is often found at lower dose levels.

The compounds of this invention are characterized by having a basic N-cyclopropylmethyl-benzmorphan nucleus. More specifically, for example, the following structures represent exemplary compounds of this invention:

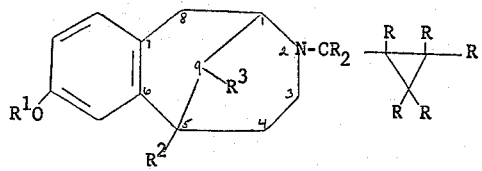

in which R represents lower alkyl of 1 to 2 carbon atoms or preferably, hydrogen; $R^1$ represents hydrogen, lower alkyl such as methyl, acyl such as acetyl, nicotinoyl, isonicotinoyl or aroyl such as benzoyl; $R^2$ and $R^3$ represent hydrogen or lower alkyl of 1 to 3 carbon atoms preferably methyl.

The advantageous compounds are those in the normal or iso series in which R is hydrogen; $R^1$ is hydrogen, methyl or nicotinoyl; $R^2$ and $R^3$ are methyl.

Also included in this invention are various isomers of the above-noted structures, such as cis-trans isomers ("normal" and "iso" series, respectively) at the 5,9 positions, or individual optical isomers which might be separated by fractional crystallization of the diastereoisomeric salts formed, for instance, with d- or l-tartaric acid or D-(+)-α-bromocamphor sulfonic acid. The important iso series of compounds is assumed to have the 9-methyl group in the trans or distal position related either to the 5-methyl group or the 2-N-substituent, however, the absolute configuration of these compounds is not readily apparent at this time.

The bases of this invention may be used as such or in the form of their nontoxic, pharmaceutically acceptable acid addition salts. Such salts are prepared from suitable acids, such as inorganic acids, for instance, hydrochloric, hydrobromic, sulfuric, phosphoric, or sulfamic acid; or organic acids, for instance, acetic, maleic, ethanedisulfonic, glycolic, salicylic and fumaric acids. The acid addition salts are prepared by reacting the base with either one equivalent of acid or preferably an excess in an organic solvent such as chloroform or an ethanol ether mixture. Alternatively, an acid salt of the base, say the hydrochloride, can be reacted with a salt such as the ammonium salt of an organic acid in an aqueous mixture to form an insoluble salt by double decomposition.

The compounds of this invention are prepared by reacting the corresponding 5,9-dialkyl-6,7-benzmorphan starting material [U.S. Patent No. 2,924,603 (Brt. 862,-249) and U.S. Patent No. 2,959,594 (Brit. 873,925)] having a secondary amine function at position 2 with the appropriate reactive cyclopropylalkyl halide, such as the chloride, bromide or iodide, usually in the presence of an acid binding agent such as an alkali metal carbonate, hydroxide, etc. The carbonates are preferred such as sodium bicarbonate, potassium bicarbonate, sodium carbonate and potassium carbonate. The reaction is run in an organic solvent in which the reactants are mutually souble such as a lower alcohol for instance ethanol, methanol or isopropanol. The reaction is preferably run at the reflux temperature of the mixture at from 1 to 24 hours.

The product is isolated by concentrating the filtered molten solution. The residue is taken into an organic solvent in which the inorganic salts in the mixture are not soluble, such as ether chloroform or benzene. The dried organic extracts are then worked up to give the desired base.

Alternatively certain of these N-cyclopropylmethyl-benzmorphan derivatives, particuluarly the methylated compounds, can be prepared by N-acylation using the readily available cyclopropanecarbonyl halides to give the N-acyl derivatives followed by reduction under mild conditions such as with lithium aluminum hydride to give the N-cyclopropylmethyl compound.

The 2'-hydroxyl moiety of the compounds of this invention behaves as a normal phenolic hydroxyl in that it can be esterified or etherified with retention of activity. For instance, the acetate can be formed by using an excess of acetic anhydride under standard reaction conditions. The methyl ether can be formed by reaction with diazomethane, preferably before N-alkylation. As a practical matter, the carbon content of the acyl or alkyl portions of these derivatives shall be a maximum of 7. Other acyl moieties exemplary of those included are the benzoate, nicotinoate, propionate, isobutyrate, etc. The acetate is preferred.

The following examples are illustrative of the compounds of this invention and the synthetic procedures for preparing these compounds.

*Example 1*

A mixture of 5 g. of 5,9-dimethyl-2'-methoxy-6,7-benzmorphan, prepared by reacting 5,9-dimethyl-2'-hydroxy-6,7-benzmorphan (U.S. Patent No. 2,924,603) in ethanol with ethereal diazomethane in a closed vessel overnight, evaporating and extracting the methoxy intermediate into ethyl ether, in 110 ml. of ethanol with 2.68 g. of sodium bicarbonate and 1.8 g. of cyclopropylmethyl chloride, is stirred under reflux with an efficient condensing surface for five hours. The solvent is evaporated. The oily residue is extracted with benzene. The washed and dried benzene extracts are treated with hexane to give a residue which is dissolved to acetone and treated with ether to separate the desired 2-cyclopropylmethyl - 5,9 - dimethyl-2'-methoxy-6,7-benzmorphan. The base is dissolved in ethanol and treated with ethereal hydrogen chloride to give the hydrochloride salt.

*Example 2*

A mixture of 21 g. of 5,9-dimethyl-2'-hydroxy-6,7-benzmorphan, 9 g. of cyclopropylmethyl chloride, 16 g. of sodium bicarbonate and 350 ml. of ethanol is stirred under reflux for 19 hours. The cooled mixture is filtered and the filtrate concentrated to leave a residue which is extracted with boiling benzene. The residue therefrom is recrystallized to give 2-cyclopropylmethyl-5,9-dimethyl-2'-hydroxy-6,7-benzmorphan. This compound is dissolved in ethanolic hydrogen chloride and triturated with ether to give the hydrochloride salt. Substituting α-bromoethylcyclopropane (Beilstein 5I6) for the chloride in equimolar quantities gives 2-α-cyclopropylethyl-5,9-dimethyl-2'-hydroxy-6,7-benzmorphan.

*Example 3*

A mixture of 0.5 g. of 2-cyclopropylmethyl-5,9-dimethyl-2'-hydroxy-6,7-benzmorphan in 10 ml. of acetic acid and 15 ml. of acetic anhydride is allowed to stand overnight. It is then warmed on the steam bath briefly, quenched in water, neutralized with carbonate and extracted to give 2'-acetoxy-2-cyclopropylmethyl-5,9-dimethyl-6,7-benzmorphan. Substituting an excess of nicotinoyl chloride in pyridine gives the nictinoyl ester, M.P. 157–160° C., 4 HCl.

*Example 4*

A mixture of 1 g. of iso - 5,9 - dimethyl-2'-hydroxybenzmorphan (U.S. Patent No. 2,959,594), 0.5 g. of cyclopropylmethyl chloride, 0.8 g. of sodium carbonate and 200 ml. of ethanol is stirred under reflux for 19 hours. The cooled mixture is worked up as in Example 2 to give iso - 2-cyclopropylmethyl-5,9-dimethyl-2'-hydroxy-6,7-benzmorphan.

*Example 5*

A mixture of 3.3 g. of 5,9-dimethyl-2'-hydroxybenzmorphan and 2.1 g. of cyclopropanecarbonyl chloride [Monatsh., 70, 377 (1937)], in an excess of potassium carbonate in water is stirred for several hours, diluted with water and extracted with chloroform-benzene to give the N-acyl compound. This crude product in excess ether-tetrahydrofuran is reacted with an excess of 1.5 M ethereal lithium aluminum hydride at reflux overnight. The reaction mixture is evaporated carefully to dryness after being quenched with water to give the desired 2-cyclopropylmethyl derivative.

Substituting in equimolar amounts 1,2,3-trimethylcyclopropanecarbonyl chloride (prepared from the acid reported in Chem. Abs., 54, 657a) in the reaction above gives 5,9-dimethyl-2'-hydroxy-2-(1,2,3-trimethyl) cyclopropylmethylbenzmorphan. Substituting 2,2-diethylcyclopropanecarbonyl chloride [from the 2,2-diethylcyclopropanecarboxylic acid of Nelson et al., J. Am. Chem. Soc., 79, 3467 (1957)] gives the 2-(2,2-diethyl) cyclopropylmethyl derivative. The 2-methylcyclopropanecarbonyl chloride [(Cannon et al., J. Am. Chem. Soc., 81, 1660 (1959)] gives the 2-(2-methyl)cyclopropylmethyl derivative. Also similarly the 1-methyl and 1,2,2-trimethylcyclopropyl methyl derivatives are prepared.

*Example 6*

A mixture of 2.1 g. of 5-ethyl-9-methyl-2'-hydroxy-6,7-benzmorphan (prepared by the method of May et al., J. Org. Chem. 24, 294 (1959), using β-collidine as starting material), 1 g. of cyclopropylmethyl chloride, 1.6 g. of sodium bicarbonate and 50 ml. of water is reacted and worked up as in Example 2 to give 2-cyclopropylmethyl - 5 - ethyl-9-methyl-2'-hydroxy-6,7-benzmorphan.

Other 5,9 analogues are prepared by starting with the respective pyridines.

The compounds of the formula on page 2 in which R is lower alkyl of 1 to 2 carbon atoms are preferably, hydrogen; $R^2$ and $R^3$ are hydrogen or preferably methyl and $R^1$ is isonicotinoyl or preferably nicotinoyl have particularly outstanding biological properties such as having anticonvulsant, analgesic and tranquilizing activities. The anticonvulsant and tranquilizing properties of these ester derivatives set them apart from the parent compounds.

Other ester members of this series are prepared as in Example 3 using the parent compounds made as described in the other examples.

What is claimed is:

1. A member of the group consisting of a base of the formula:

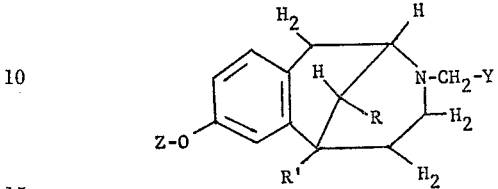

wherein Y is cyclopropyl; R is a member of the group consisting of hydrogen, methyl and ethyl; R' is a member of the group consisting of hydrogen and alkyl of 1 to 3 carbon atoms, and Z is a member of the group consisting of lower alkanoyl and pyridine carbonyl, and non-toxic addition salts of said base with pharmaceutically acceptable acids.

2. A member of the group consisting of a base of the formula:

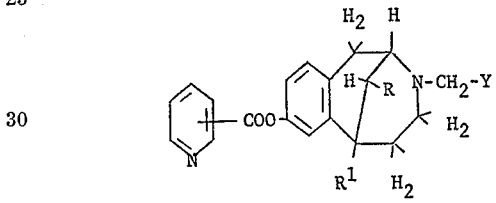

wherein Y is cyclopropyl, R is a member of the group consisting of hydrogen, methyl and ethyl, and $R^1$ is a member of the group consisting of hydrogen and alkyl of 1 to 3 carbon atoms, and non-toxic addition salts of said base with pharmaceutically acceptable acids.

3. A compound selected from a base and its non-toxic salts with pharmaceutically acceptable acids, said base being of the structure:

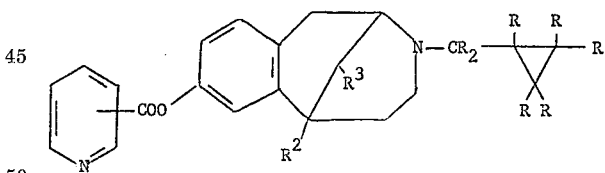

in which R is a member selected from the group consisting of hydrogen and alkyl of 1 to 2 carbon atoms and $R^2$ and $R^3$ are, respectively, members selected from the group consisting of hydrogen and alkyl of 1 to 3 carbon atoms.

4. 2' - nicotinoyloxy-2-cyclopropylmethyl-5,9-dimethyl-6,7-benzmorphan.

References Cited

UNITED STATES PATENTS 2,924,603   2/1960   Gordon et al. _____ 260—293.4
2,959,594   11/1960  Gordon et al. _____ 260—294.3

WALTER A. MODANCE, *Primary Examiner.*

D. T. McCUTCHEN, I. MARCUS, *Examiners.*

D. M. KERR, A. D. SPEVACK, *Assistant Examiners.*